Feb. 6, 1968   F. H. COOPER   3,367,548
FRONT CARRIER FOR MOTORCYCLE
Filed July 11, 1966
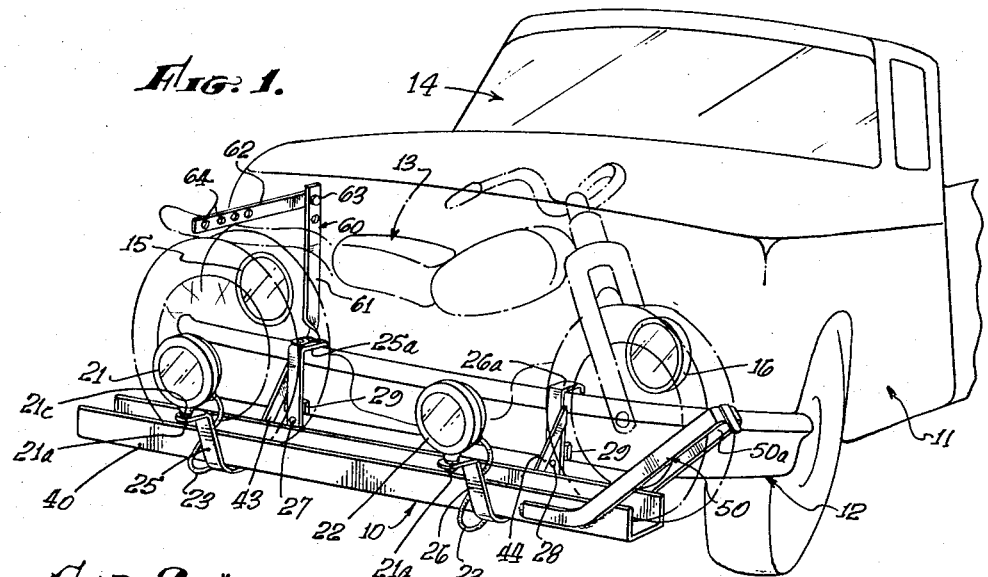
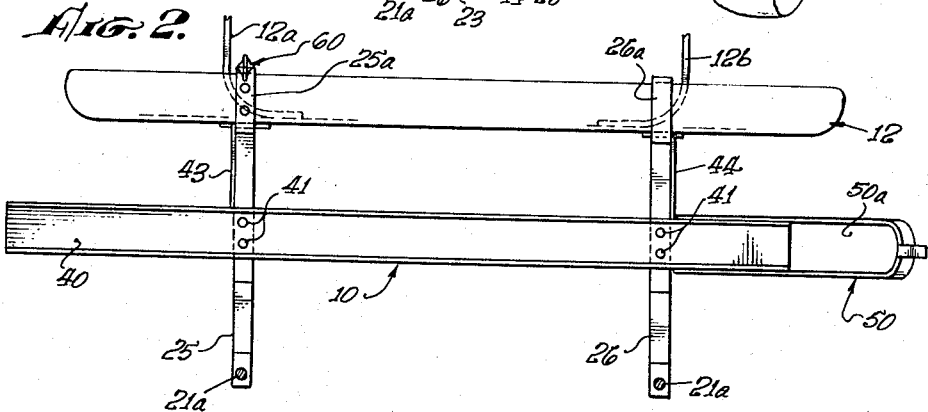
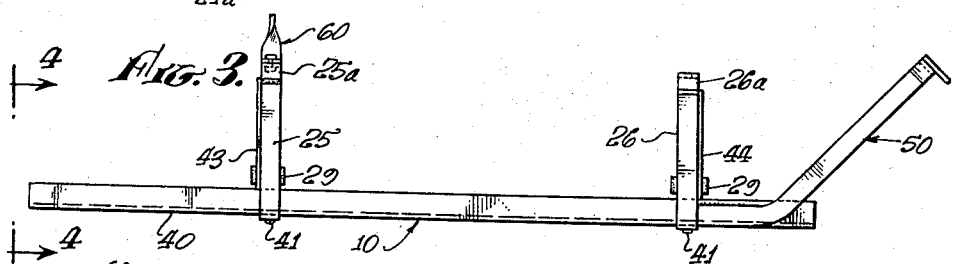
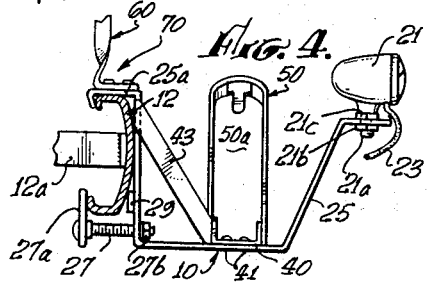
INVENTOR.
FRANK H. COOPER,
By
Edmond F. Shanahan
ATTORNEY.

United States Patent Office 3,367,548
Patented Feb. 6, 1968

3,367,548
FRONT CARRIER FOR MOTORCYCLE
Frank H. Cooper, 2815 W. Olive Ave.,
Burbank, Calif. 91505
Filed July 11, 1966, Ser. No. 569,543
3 Claims. (Cl. 224—42.03)

ABSTRACT OF THE DISCLOSURE

A motorcycle carrier rack incorporating auxiliary headlights for mounting on the front bumper of an automobile in which the motorcycle is carried in a transverse channel, and the headlights are vertically adjustable on a pair of vertical bracket structures, channel and brackets being combined in a rigid unit which is mated to the support structure of the automobile bumper.

---

This invention relates generally to a carrier rack for transporting a motorcycle on the front of an automobile, and more particularly, the invention relates to such a rack in which a transverse loading and carrying channel and auxiliary headlights are combined into a structure which passes under the motor cycle to the front bumper bracket structure.

A motorcycle presents a bulky, heavy, and awkward load for transport by the average passenger automobile or small truck. It is unlawful to mount racks which project from the sides of the truck. In the past, racks have not been available for legally mounting a motorcycle to the front of the truck, since such racks obscure the headlights. Some compromise arrangements have been made by improvised headlight arrangements in addition to bumper racks, but none of these have found widespread acceptance, because they have been of an improvised constuction which was not secure over long rough trips. In general, motorcycles have been carried on the rear of the vehicle, very commonly on transverse rear bumper racks.

Obviously, front bumper mounting is to be much preferred over rear bumper mounting in trucks, in order to permit loading and unloading from the rear. Also the rear bumper racks are troublesome with passenger vehicles, not only because they interfere with loading and unloading from a station wagon rear door, or a rear trunk, but also because passenger vehicles usually have soft rear springs and long overhang, making the cantilevered load of a motorcycle undesirable.

The design of a suitable front bumper rack has not been achieved in the past because it appeared to combine two conflicting problems. On the one hand, such a rack would be required to support an auxiliary pair of front headlights forward of the transported motorcycle, but on the other hand, it must be practical to quickly load or unload the motorcycle from the rack at an elevation so low as to interfere with any heretofore proposed headlight support means. It will be understood that the motorcycle must be mounted at a low level so as to not interfere with the vision of the driver, and the headlights must be supported with rigidity approximating that of the headlights in the automotive vehicle itself.

I have found a method of combining both the motorcycle loading and carrying rack with the means for supporting the auxiliary headlights in a single structure, which can be mounted to a variety of front bumper shapes, in such a way as to integrate the motorcycle carrier rack with the bumper bracket structure of the automotive vehicle.

Since the rack of the invention is adjustable to accommodate various bumper cross-sections, and since it locks to the bumper in the region of the bumper's attachment to the bumper brackets, overall rigidity is achieved, both for motorcycle carriage and fo rsupport of the auxiliary headlights.

The foregoing and other objects and advantages of the invention will best be understood from a description of one preferred specific embodiment, illustrative of the construction of the invention, which is illustrated in the accompanying drawings, in which:

FIGURE 1 is a perspective view of the motorcycle carrier of the invention, seen as it is mounted on the front of a truck with a transported motorcycle in position, the motorcycle being shown in phantom lines;

FIGURE 2 is a plan view of the carrier of the invention, as it is mounted on the front bumper but with the motorcycle removed;

FIGURE 3 is a front-elevational view of the carrier rack of the invention; and

FIGURE 4 is a left-side view of the carrier rack of the invention, showing the bumper in cross-section, as viewed in the direction of the arrows 4—4 in FIGURE 3.

In FIGURE 1, the carrier rack of the invention is indicated generally by the numeral 10, and is seen to be mounted transversely in front of a truck 11, on the front bumper 12 thereof. A motorcycle 13 is shown in phantom line as mounted in transport position on the carrier rack 10.

It will be seen that, although the motorcycle 13 is carried so low relative to the truck windshield 14 that the driver has good visibility, the truck headlights 15 and 16 are obscured by the wheels of the motorcycle 13. Consequently, the carrier 10 is provided with a pair of auxiliary headlights 21 and 22 which are connected by suitable wiring 23, not novel or a part of this invention, to a headlight switch of the truck 11. The headlights 21 and 22 are carried on inverted-U brackets 25 and 26, which are mounted to the front bumper 12 of the truck 11 in a manner to be described hereinafter, and provided the main supporting structure for the entire carrier 10.

Headlights 21 and 22 are vertically adjustable on vertical threaded shafts 21a and clamping nuts 21b and 21c seen in FIGURE 4. Also, headlights 21 and 22 can be pivoted independently to insure that both are directed forward and parallel regardless of some irregularity in disposition of the bumper 12. It is important to note from the plan view of FIGURE 2 that the inverted-U brackets 25 and 26 are spaced to clamp on bumper 12 in the region of the bumper support arms 12a and 12b, thus providing rigid support for both motorcycle 13 and auxiliary headlights 21 and 22. It is not necessary that the inverted-U brackets 25 and 26 coincide exactly with the location of bumper arms 12a and 12b, as long as they are spaced so near the region of said bumper arms that they form a strong integrated structure. Remote spacing from the location of bumper arms 12a and 12b might produce deformation of the soft material usually used in bumpers like bumper 12.

As seen from the end view of FIGURE 4, the inverted-U brackets 25 and 26, which are each attached to the bumper 12 in an identical manner, are clamped in position by means of a posterior inverted hook 25a, which loops over the top of the bumper 12, and a clamping bolt 27, having an integral clamp 27a at the head and a tightening nut and washer 27b exposed in front of the rear leg of bracket 25. A similar clamping bolt 28 is provided for inverted-U bracket 26. This simple bracket attachment can be accommodated to almost any bumper contour by means of wooden spacers such as wood spacer 29, seen in FIGURES 1 and 4.

An upwardly opening track channel 40 is supported in a horizontal position, transversely in front of the truck 11 on support brackets 25 and 26, as seen in FIGURES 1 to 4. The width of channel 40 is such as to accommodate almost any tire size used on a motorcycle, and is of sufficient length to accomodate almost all motorcycle lengths. A three or four foot board or piece of steel channel may be used as a mounting ramp, not shown, for easily rolling the motorcycle 13 up into the position on the carrier 10 as illustrated in FIGURE 1.

In the embodiment illustrated, the track channel 40 is securely attached to the inverted-U brackets 25 and 26 by standard fastener means (bolts or rivets) 41, and the brackets are reinforced against drooping at the critical points of support by means of oblique tie-braces 43 and 44, which are welded to the respective brackets 25 and 26 between attachment hooks 25a and 26a and the support locations for channel 40.

Once the motorcycle 13 is rolled into position, it is held upright by a front wheel holder 50 usually formed as a U-shaped stop welded to channel 40 as illustrated, which provides a slot space 50a for reception of the front wheel tire.

The motorcycle 13 is then bolted securely into place by means of a frame bracket indicated generally by the numeral 60, which is comprised of a vertical member 61, integrally bolted to the upper surface of hook 25a, and a frame holder link 62 which is adjustably attached to the vertical member 61 by means of a pivotable bolt attachment at 63. The link 62 is provided with a number of bolt holes 64 so that an attachment bolt, of any suitable length, and not shown, may be used to securely bolt to the upper rear frame of the motorcycle 13. The particular method of bolting the motorcycle 13 to link 62 is no part of the present invention and may be accomplished by any of the means and equipment common and well known to those who ship, transport, or work on motorcycles, the best style of bolted attachment naturally varying with the infinite variety of makes and models of motorcycles; for example, the attachment bolt may pass through any adjacent part of the motorcycle frame which closely accommodates the bolt or its associated nuts, washers, clamps, or fittings, or the motorcycle frame may be drilled in a suitable place to accommodate the attachment bolt, or a short length of chain, or heavy strap, as commonly used for locking or tieing down a motorcycle, may be looped through the motorcycle frame and the bolt passed through links, or holes.

It will be seen that the construction of motorcycle carrier 10 avoids another problem, not heretofore mentioned, which has rendered useless many proposed front carrier designs. It is desirable to support the motorcycle 13 as close to the front bumper 12 as possible; that is, the forwardly projecting cantilever load should have the shortest possible forward arm. Unfortunately, the left side of the average and usual motorcycle has a projecting stud, pedal, or other device which is likely to engage the front of the truck 11 or the carrier rack, or even the bumper 12, if the motorcycle is carried at sufficiently low elevation to provide a clear field of vision for the driver. In the construction of the invention, however, it will be seen as indicated by the arrow 70 in FIGURE 4, that the left-side stud of the typical motorcycle has a clearance location, through which it may pass as the motorcycle 13 is rolled into position on channel track 40. This is possible because of the inverted-U construction, which leaves very little in the line of strength and support to be required of the frame support bracket 60.

While I have disclosed one specific embodiment of my invention, I wish it to be understood that the scope of the invention is not limited to the details disclosed, but includes all modifications or changes, whether more elaborate or less elaborate than the structure illustrated in FIGURES 1 to 4, which incorporate the elements of my invention as defined by the following claims.

What is claimed is:

1. A motorcycle carrier rack for transverse mounting on the front bumper structure of an automotive vehicle, which carrier includes:

right and left forwardly projecting U-brackets, transversely spaced from each other to mate with the bumper arm support structures of said automotive vehicle, each of said brackets being disposed substantially in a vertical plane and having a forwardly projecting support region substantially below the headlight level of said automotive vehicle, and an upwardly extending forward portion for supporting an auxiliary headlight at a suitable headlight level for said automotive vehicle;

a pair of headlights adjustably mounted on the upper forward ends of said brackets;

an upwardly opening channel track supported on the upper surfaces of said support regions, transversely of said automotive vehicle and to the rear of said auxiliary headlights, for accommodating the tires of a motorcycle;

wheel holding means at one end of said channel track for reception of the wheel of a motorcycle;

bracket means comprising part of said carrier for bolting the frame of said motorcycle to said carrier;

and a pair of clamping means for clamping said carrier to said front bumper in the vicinity of said bumper arm support structures.

2. A motorcycle carrier rack for transverse mounting on the front bumper structure of an automotive vehicle, which carrier includes:

right and left forwardly projecting U-brackets, transversely spaced from each other to mate with the bumper arm support structures of said automotive vehicle, each of said brackets being disposed substantially in a vertical plane and having a forwardly projecting support region substantially below the headlight level of said automotive vehicle, and an upwardly extending forward portion for supporting an auxiliary headlight at a suitable headlight level for said automotive vehicle;

a pair of headlights adjustably mounted on the upper forward ends of said brackets;

an upwardly opening channel track supported on the upper surfaces of said support regions, transversely of said automotive vehicle and to the rear of said auxiliary headlights, for accommodating the tires of a motorcycle;

wheel holding means at one end of said channel track for reception of the front wheel of a motorcycle;

a vertically disposed rigid bracket member, upwardly extending from the upper rear portion of the one of said U-brackets nearest the rear wheel location of a motorcycle on said motorcycle carrier, said bracket means being provided with a front recess at the elevation of left side projections from said motorcycle, to accommodate the passage of said motorcycle as it is rolled into position on said channel track;

frame clamping means pivotally attached to the upper end of said vertically disposed bracket member for rigid holding attachment to the frame of said motorcycle;

and a pair of clamping means for clamping said carrier to said front bumper in the vicinity of said bumper arm support structures.

3. A motorcycle carrier rack for transverse mounting on the front bumper structure of an automotive vehicle, which carrier includes:

right and left forwardly projecting U-brackets, transversely spaced from each other to mate with the bumper arm support structures of said automotive vehicle, each of said brackets being disposed substantially in a vertical plane and having a forwardly projecting support region substantially below the headlight level of said automotive vehicle, and an upwardly extending forward portion for supporting an auxiliary headlight at a suitable headlight level for said automotive vehicle;

a pair of headlights adjustably mounted on the upper forward ends of said brackets;

an upwardly opening channel track supported on the upper surfaces of said support regions, transversely of said automotive vehicle and to the rear of said auxiliary headlights, for accommodating the tires of a motorcycle;

wheel holding means at one end of said channel track for reception of the front wheel of a motorcycle;

a pair of inverted hooks, one at the rear end of each of said U-brackets, for hooking over the top of said front bumper;

spacer means between the surface of said front bumper and the rear surfaces of said U-brackets for accommodating the contours of said bumper and bringing said carrier rack into a substantially horizontal position;

and a pair of clamping means, one for each of said U-brackets, each of said clamping means extending under said bumper and engaging the rear surface thereof to tightly hold said carrier rack in position on the front bumper structure of said automotive vehicle.

References Cited

UNITED STATES PATENTS

| | | | |
|---|---|---|---|
| 2,379,994 | 7/1945 | Schwinn | 224—42.03 |
| 2,415,286 | 2/1947 | Hyde | 224—42.03 |
| 2,552,977 | 5/1951 | Klotz | 224—42.03 |
| 3,176,903 | 4/1965 | Farley | 224—42.03 |
| 3,207,396 | 9/1965 | Mundell et al. | 224—42.03 |
| 3,225,986 | 12/1965 | Anderson | 224—42.03 |
| 3,251,520 | 5/1966 | Van Dyke et al. | 224—42.03 |

GERALD M. FORLENZA, *Primary Examiner.*

R. J. SPAR, *Assistant Examiner.*